April 7, 1931.  I. BROWN  1,799,155
CORN DISH
Filed Nov. 18, 1929
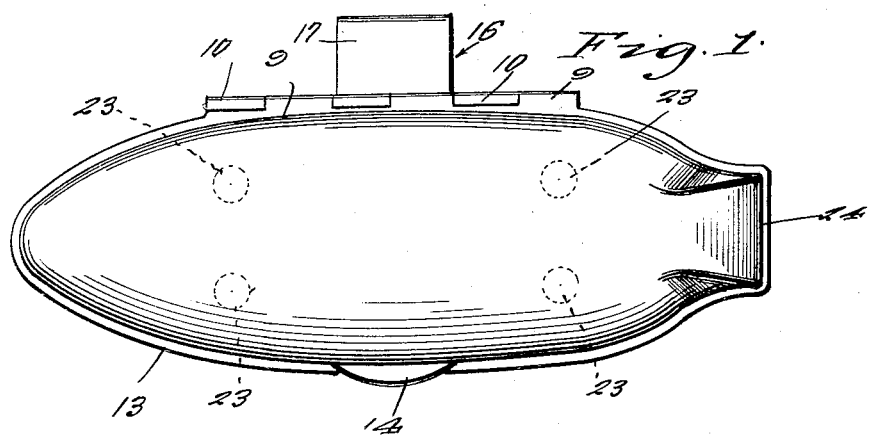
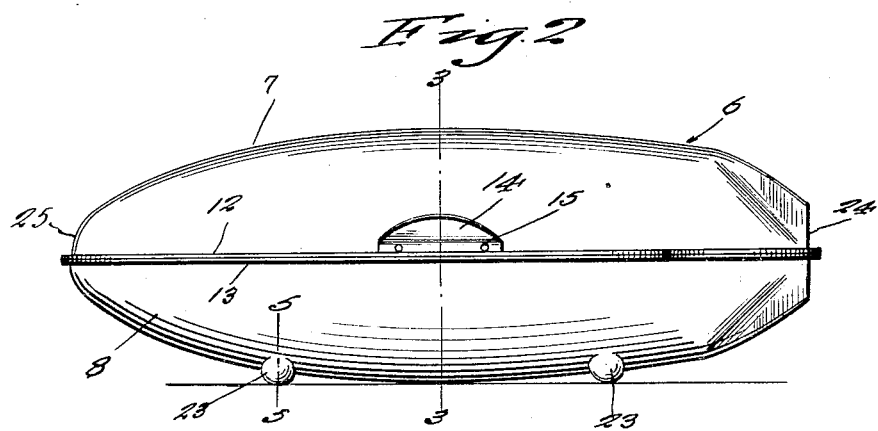
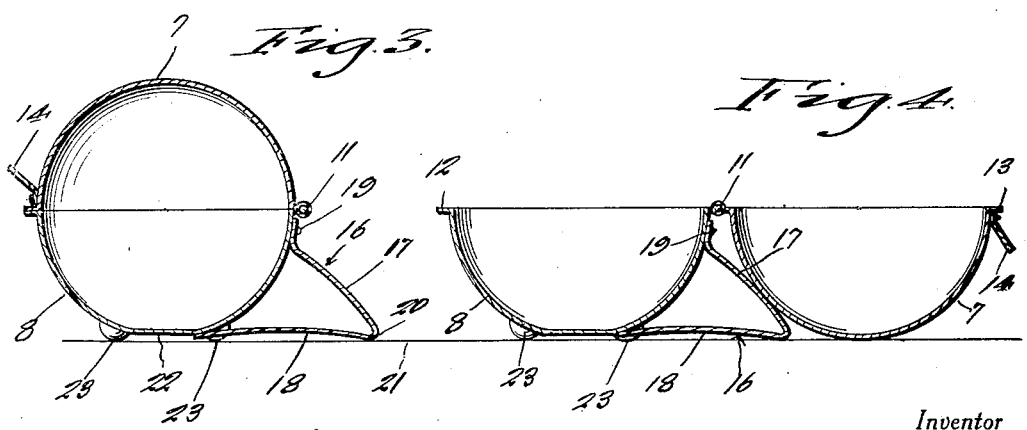
Inventor
Ingram Brown
By Clarence A. O'Brien
Attorney Patented Apr. 7, 1931

1,799,155

UNITED STATES PATENT OFFICE

INGRAM BROWN, OF SARATOGA SPRINGS, NEW YORK

CORN DISH

Application filed November 18, 1929. Serial No. 408,014.

This invention relates to corn dishes and an object of the invention is to provide a covered dish for serving individual persons with ears of corn.

Another feature of the invention is to provide the bottom section of the corn dish with a support member that aids in supporting the both sections when in closed position, that also serves as a handle and furthermore affords a stop member and prevents overturning when the corn dish is in the open position.

With the foregoing and other objects in view, the invention consists of a novel construction, combination and arrangements of parts as will be hereinafter more specifically described and illustrated in the accompanying drawings, wherein is disclosed an embodiment of the invention, but it is to be understood that changes, variations, and modifications, may be resorted to without departing from the spirit of the claim appended.

In the drawings wherein like reference characters denote corresponding parts throughout the several views:—

Figure 1 is a top plan view of the corn dish in closed position,

Fig. 2 is a side elevation thereof,

Fig. 3 is a vertical transverse detailed section taken substantially on the line 3—3 of Fig. 2 illustrating the parts in closed position, Fig. 4 is a view similar to Fig. 3, illustrating a corn dish in the open position, Fig. 5 is a fragmentary section taken substantially on the line 5—5 of Fig. 2.

The corn dish in accordance with the present invention is formed of aluminum or other metal, that is very strong, compact and durable, very pleasing in appearance, very simple method in assembly, and comparatively inexpensive to manufacture.

Referring to the drawings in detail, 6 indicates generally the body portion of the corn dish formed of hollow, substantially elliptical configuration. The body portion is formed with an upper, semi-elliptical section 7 and a lower semi-elliptical section 8. The radius of each section of such that when the upper and lower sections are closed, the hollow interior will accommodate an ear of corn both as to the major, and minor axis of the ear of corn.

On one side edge of the upper section 7, the inner edge, there are formed a series of longitudinally spaced, registering sleeves 9 that project laterally, while the lower section 8 is formed on its inner side edge with a series of laterally projecting sleeves 10. The sleeves are so spaced that they dove-tail between each other and the openings therein register in perfect alinement to receive a pin 11 that extends through the sleeves 9 and 10 to form a hinge between the upper and lower sections of the dish.

The sleeves 9 and 10 are preferably formed integral with the body of each section as as to materially cheapen the structure. The balance of the perimeter of each section, are formed with laterally projecting flanges 12, 13 which provide a broad supporting surface when the sections are closed as shown in Figs. 1, 2 and 3 of the drawings.

The flanges are formed integral with the sections. On the upper section 7 is secured a laterally projecting handle 14 and is secured by means of rivets 15 at approximately the longitudinal center. A bracket indicated generally at 16 is secured to the inner side of the lower section 8. The bracket is substantially acute angled having legs 17, 18, the ends of which are secured as at 19 to the lower section 8.

The bracket 16 projects laterally of the body of the lower section with the vertex of the angle 20 in abutment with a supporting surface 21 such as a table or the like. The space between the legs 17 and 18 provides a handle to carry the dish, at the same time provides lateral support for the dish when it is closed and furthermore the upper leg 17 is so positioned to provide supports for the upper section 7 when it is in the open position as shown clearly in Fig. 4 of the drawings.

The bottom of the lower section is flattened out as at 22 and four depressions 23 of semispherical shape are pressed outwardly from the bottom to provide legs and also reservoirs for butter or other spreads that are poured over the hot corn prior to serving. The one end of the section is blunt and is formed with a flat end 24, while the other end of the section is rounded as at 25, and the flat end receives the stalk portion of the ear of corn while the rounded section 25 receives the free end portion.

It is to be understood that by describing in detail herein any particular form, structure, or arrangement, it is not intended to limit the invention beyond the terms of the claim or the requirements of the prior art.

Having thus described my invention what I claim as new is:—

A dish for holding an ear of corn comprising upper and lower sections hingedly connected together and each section being of elongated form and of substantially semicircular shape in cross section, the bottom of the lower section being substantially flat and having depending protuberances thereon forming feet and a substantially triangular-shaped member connected to the hinged side of the lower section, substantially at the center thereof with the lower limb thereof slightly curved upwardly and extending substantially horizontally with the other limb extending downwardly and outwardly from the upper part of the section with its apex engaging the surface on which the dish is placed, and the upper limb of the triangular shaped member forming a rest for the upper section when the same is in open position.

In testimony whereof I affix my signature.

INGRAM BROWN.